US010323759B2

(12) United States Patent
Tanner et al.

(10) Patent No.: US 10,323,759 B2
(45) Date of Patent: Jun. 18, 2019

(54) CHECK VALVE CONTROL UNIT

(71) Applicant: DeZURIK, Inc., Sartell, MN (US)

(72) Inventors: Douglas J. Tanner, Sartell, MN (US); Forrest Halvorson, Becker, MN (US); David G. Hildebrandt, St. Cloud, MN (US); Donald L. Bartell, Jr., Beaver Falls, PA (US); Dennis Jay Smith, Jr., Pittsburgh, PA (US); Timothy M. O'Shea, Palatine, IL (US)

(73) Assignee: DeZURIK, Inc., Sartell, MN (US)

( * ) Notice: Subject to any disclaimer, the term of this patent is extended or adjusted under 35 U.S.C. 154(b) by 128 days.

(21) Appl. No.: 15/279,071

(22) Filed: Sep. 28, 2016

(65) Prior Publication Data
US 2017/0089475 A1 Mar. 30, 2017

Related U.S. Application Data

(60) Provisional application No. 62/397,507, filed on Sep. 21, 2016, provisional application No. 62/233,845, filed on Sep. 28, 2015.

(51) Int. Cl.
*F16K 15/18* (2006.01)
*F16K 15/03* (2006.01)
(Continued)

(52) U.S. Cl.
CPC .......... *F16K 15/181* (2013.01); *F16K 1/205* (2013.01); *F16K 1/2007* (2013.01); *F16K 1/523* (2013.01);
(Continued)

(58) Field of Classification Search
CPC ........ F16K 15/18; F16K 15/181; F16K 15/03; F16K 31/521; F16K 31/047; F16K 1/2007; F16K 1/205; F16K 1/50; F16K 1/523
See application file for complete search history.

(56) References Cited

U.S. PATENT DOCUMENTS 2,504,006 A      4/1950  Davis et al.
3,114,389 A  *  12/1963  Steele ................ B01F 15/0201
                                                137/583
(Continued)

FOREIGN PATENT DOCUMENTS

DE    202016103458 U1 *  7/2016  ........... F16K 1/2007
GB       191502899 A  *  6/1915  ............. B63B 29/16
(Continued)

OTHER PUBLICATIONS

International Search Report and Written Opinion for PCT application No. PCT/US2016/054207 dated Dec. 12, 2016 (11 pages).
(Continued)

*Primary Examiner* — Marina A Tietjen
(74) *Attorney, Agent, or Firm* — Pauly, DeVries Smith & Deffner LLC

(57) ABSTRACT

Embodiments include a check valve that comprises a valve body defining an inlet port and an outlet port; a disc disposed within the valve body, wherein the disc is coupled to a pivot shaft and the pivot shaft is coupled to the valve body; a lever arm coupled to the disc, wherein when the disc rotates the lever arm rotates; an actuator shaft couple to a motor, and a first interference element coupled to the actuator shaft, wherein the lever arm contacts the first interference element when the disc is in a maximum open position; wherein when the motor rotates the actuator shaft moves longitudinally along its axis to move the first interference element thereby changing the maximum open position. Other embodiments are also included herein.

18 Claims, 17 Drawing Sheets

(51) Int. Cl.
*F16K 31/52* (2006.01)
*F16K 1/52* (2006.01)
*F16K 1/20* (2006.01)
*F16K 31/04* (2006.01)

(52) U.S. Cl.
CPC ............ *F16K 15/03* (2013.01); *F16K 31/047* (2013.01); *F16K 31/521* (2013.01)

(56) References Cited

U.S. PATENT DOCUMENTS

| | | |
|---|---|---|
| 3,334,858 A | 8/1967 | Hay et al. |
| 4,887,792 A * | 12/1989 | Kuo ..................... F16K 15/03 |
| | | 251/82 |
| 5,501,427 A | 3/1996 | Ando et al. |
| 6,929,238 B2 | 8/2005 | Bartell, Jr. et al. |
| 7,249,748 B2 | 7/2007 | Bartell, Jr. et al. |
| 8,465,000 B2 | 6/2013 | Bartell, Jr. et al. |
| 2009/0261285 A1 | 10/2009 | Quinn et al. |
| 2013/0228242 A1* | 9/2013 | Languedoc ........... F16K 1/2007 |
| | | 137/527 |
| 2013/0292589 A1 | 11/2013 | Zhai et al. |
| 2014/0261817 A1* | 9/2014 | Blanchard ............ F16K 39/024 |
| | | 137/630.15 |

FOREIGN PATENT DOCUMENTS

| | | |
|---|---|---|
| GB | 527810 | 10/1940 |
| GB | 1062279 | 3/1967 |
| GB | 1095247 | 12/1967 |
| WO | 2017058933 | 4/2017 |

OTHER PUBLICATIONS

International Preliminary Report on Patentability for PCT Application No. PCT/US2016/054207 dated Apr. 12, 2018 (7 pages).

* cited by examiner

CHECK VALVE CONTROL UNIT

This application is a non-provisional application claiming priority to U.S. Provisional Application No. 62/233,845, filed Sep. 28, 2015 and U.S. Provisional Application No. 62/397,507, filed Sep. 21, 2016, the contents of which are herein incorporated by reference in their entirety.

FIELD OF THE TECHNOLOGY

The present application relates to a control and check valve. More specifically, the present application relates to a check valve that includes a mechanism to control the amount of opening of the check valve such as by using a motor.

BACKGROUND

Check valves are used in piping systems, frequently with a pump. When a pump is started, the fluid the pump is pumping can build up pressure in the space downstream of the pump. In order to prevent a sudden rush of fluid into the remainder of the piping system that may cause a pressure surge, a check valve can slowly open to allow fluid to pass through the valve and into the remainder of the piping system. When a pump is shut off, the flow velocity can change rapidly and cause a pressure surge, including a reverse fluid flow back through the valve. The fluid downstream of a pump is ordinarily at a higher pressure than fluid upstream of the pump. Therefore, upon a failure of the pump, such as due to loss of power, the fluid will start to back flow through the piping system. Back flow through a piping system can lead to numerous problems, such as back driving a pump or contaminating upstream fluid or upstream piping components.

Accordingly, there is a need for valve that can allow fluid to flow into a piping system upon reaching a desired pressure, as well as a valve that can prevent back flow of fluid, such as due to a pump failure.

SUMMARY

A check valve is disclosed herein, including an adjustable check valve that allows for the position of a rotating valve disc to be controlled. The check valve is adjustable so as to control the rotation of the valve disc, allowing positions where the valve disc is locked closed, locked open, allowed to move between open and closed positions, as well as allowed to move between partially open and partially closed or entirely closed positioned. The check valve is further optionally configured to have a drain function that allows for the valve to be partially opened, even when there is a back pressure, to drain areas downstream of the valve.

In an embodiment, the check valve can include a valve body defining an inlet port and an outlet port, the inlet port being in fluid communication with the outlet port. The check valve further includes a disc disposed within the valve body. The disc is configured to move from a closed position to an open position by rotating, such as around a pivot shaft. The disc is coupled to the pivot shaft and the pivot shaft can be coupled to the valve body.

In a closed position, the disc substantially stops the flow of fluid into the inlet port and out of the outlet port. In an open position the disc allows at least some fluid to enter the inlet port and exit the outlet port. The check valve can further include a lever arm coupled to the disc, wherein when the disc rotates the lever arm also rotates. As will be described further below an interference element (for example a roller or a pivoting nut) can engage the lever arm so as to limit the rotation of the lever arm, and thereby limit rotation of the valve. The interference element is typically a roller, a nut, or another interface for contacting the lever arm.

The interference element is coupled to an actuator shaft, wherein the lever arm contacts the first interference element when the disc is in a maximum open position. When the motor rotates the actuator shaft can move or translate longitudinally along its axis to move the first, interference element thereby changing the maximum open position. In an embodiment, the motor rotates the first interference element moves along an axis that is perpendicular to the flow of fluid from the inlet port to the outlet port.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present application is defined by the appended claims and their legal equivalents.

BRIEF DESCRIPTION OF THE FIGURES

The technology may be more completely understood in connection with the following drawings, in which.

Figure 1:
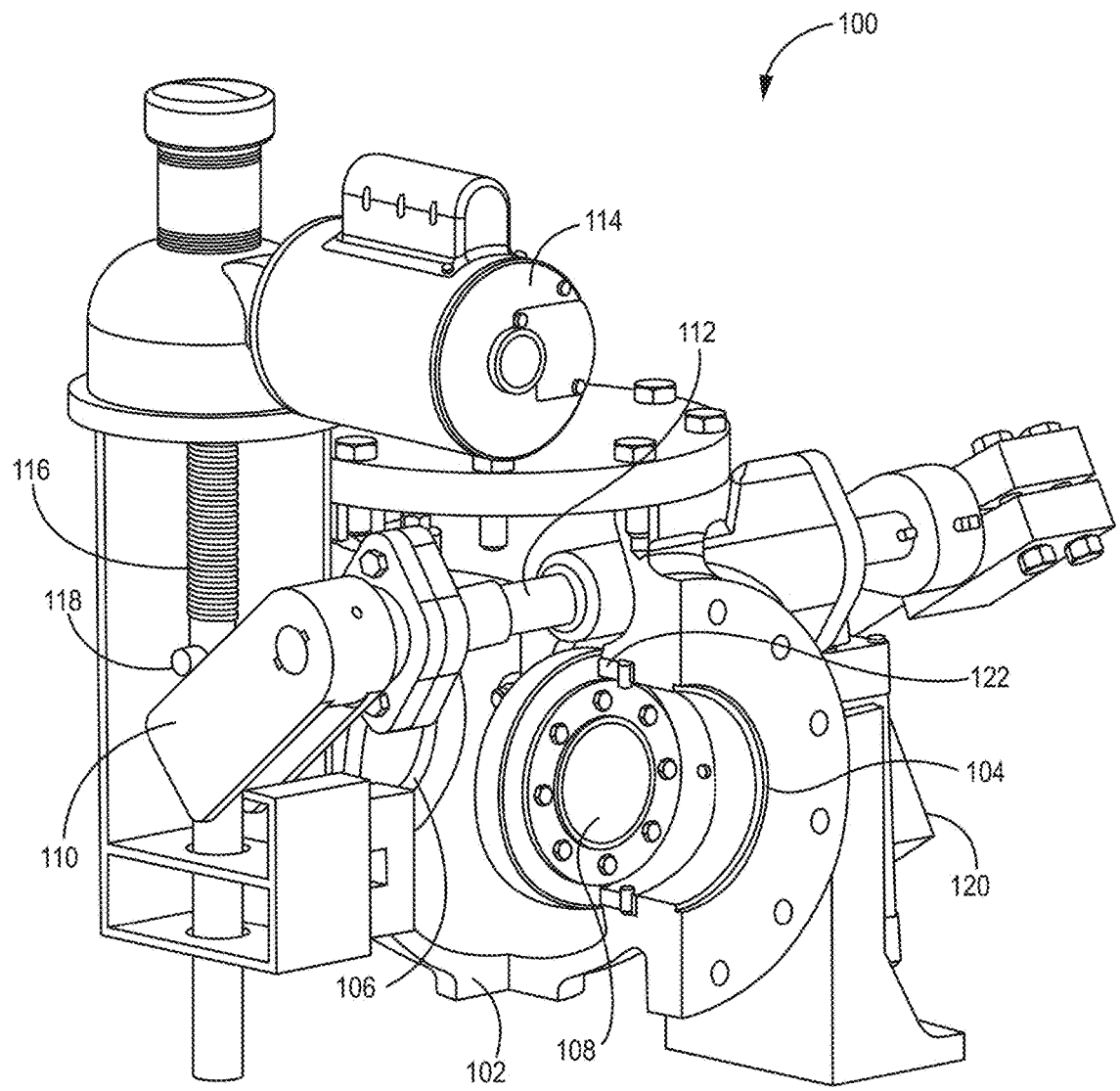
FIG. 1 is a partial cutaway perspective view of a check valve, according to an embodiment, showing the valve closed by the valve disc, and the valve disc unable to open.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The check valve, as described herein, can be configured to control the opening and closing of the valve, including the speed of opening and closing, and to close quickly when the inlet pressure falls below the outlet pressure. The check valve can be a part of a piping system, such that the valve can be coupled to one or more pipes or pumps.

Generally, the disc can rotate from a closed position to an open position and from an open position to a closed position. In the closed position, the disc substantially prevents fluid from flowing through the valve. In a completely open position, the disc can be entirely out of the path of fluid flowing from the inlet of the valve to the outlet of the valve. In normal operation, the disc is frequently in a position between the closed position and the completely open position. In such a position, the disc can somewhat restrict flow through the valve, such as by occupying a portion of the fluid path from the valve inlet to the valve outlet through the valve, thereby acting as a fluid control valve. When the disc is closer to the closed position, the disc can restrict the flow more than when the disc is closer to the completely open position.

In some embodiments the disc is able to rotate between the closed position and the completely open position. The disc can freely rotate between the two positions, such that the rotation of the disc is not driven by a motor. In various embodiments, the disc is rotated by the force of fluid flowing through the valve, or a decrease in force of fluid flowing through the valve. The disc can optionally be coupled to a counter weight that biases the disc in a closed position, such that when there is not any fluid forcing the disc open or only a minimal force not large enough to overcome the biasing force to move the disc, the disc is in the closed position.

The disc is typically coupled to a lever arm, such as through a linkage or a pivot shaft, such that when the disc is displaced by the flow of fluid, the lever arm is also rotationally displaced. In various embodiments, the disc and lever arm are displaced in equal amounts, such that the disc and the lever arm rotate the same amount as each other.

The check valve can include a motor coupled to an actuator shaft, and this actuator shaft moves interference elements (one or more) which engage with the lever arm to control rotation of the disc. Alternatively, the actuator shaft can be manually controlled, such as by a rotatable handle. The interference elements can be, for example a roller. Rotating the actuator shaft move the interference element linearly along an axis defined by the actuator shaft. The interference element can provide a hard stop for the lever arm and disc, such that as the disc opens the lever arm moves closer to the first interference element. Eventually, if the disc continues to become more open, the lever arm can contact the first interference element thereby stopping rotation of the lever arm and stopping the disc from opening any further. In various embodiments, the lever arm or disc contacts the first interference element when the inlet line pressure exceeds the outlet pressure. The location of the first interference element along the axis of the actuator shaft can be moved to control maximum open position of the disc.

A closed position of the disc can describe a condition where the disc substantially stops the flow of fluid through the valve. In an embodiment, when the disc is in a closed position, the face of the disc can be perpendicular to the path from the inlet port of the valve to the outlet port. A maximum open position of the disc can describe a condition where the disc contacts the first interference element and the first interference element prevents the disc from opening or rotating to a more open position. A maximum open position of the disc can occur at any point between the closed position and the completely open position depending on the position of the first interference element. In various embodiments, while the valve is in operation, the disc can be primarily in the maximum open position, such that the disc is limited to how much the disc can open by the first interference element. A completely open position of the disc can describe a condition where the disc is completely open. In some examples of a completely open position, the disc contacts the first interference element and the first interference element is in the most open position the first interference element can be in. In other examples of a completely open position, the disc is unable to open any further regardless of the position of the first interference element or the disc is completely removed from the fluid's path from the inlet port to the outlet port, such that the disc does not restrict fluid flowing along the path.

Allowing the disc to freely rotate around a pivot shaft can allow the disc to close upon a decrease in pressure being applied by the fluid to the front face of the disc. If flow completely stops, such that the force on the front face of the disc is greatly decreased, the disc can freely close. In some scenarios, the piping system downstream of the check valve can have a relatively high pressure, such as from an upstream pump. If the upstream pump loses power or otherwise fails, the piping system can naturally attempt to normalize the pressure throughout the piping system. In some scenarios this can lead to a back flow of fluid through the system.

The disc can close upon a pressure force acting on the back face of the disc. The back face of the disc can be on the opposite side of the disc from the front face. When the fluid is flowing backwards, the pressure on the back face can close the disc, thereby stopping fluid flow through the check valve. In various embodiments, the check valve can include a compression element that helps prevent the disc from slamming shut caused by fluid flowing backwards. The compression element can prevent the disc from slamming shut and thereby decrease the chances of breaking portions of the check valve, such as the valve seat. Allowing the disc to freely rotate allows the fluid flow to force the check valve open and closed depending on the direction of flow.

Pressure surges in liquid piping systems can burst pipes causing safety issues, flooding and/or equipment damage. Pressure surges can be caused by rapidly changing the velocity of the fluid in the piping system. Starting and stopping pumps within the piping system can cause rapid velocity changes that can cause surge pressures.

As described above, the check valve can be coupled to an upstream pump. A normal valve opening sequence can include first starting the upstream pump as the first interference element holds the disc tightly closed against the running pump. After the pump is up to speed and pressure is developed against fluid pressure caused by the front of the disc, the valve's motor can be given an open command. Upon the motor receiving the open command, the actuator shaft can begin to thread into the bottom of the electric motor and extend out the top at a slow, controlled, pre-set rate controlled by the motor. The interference element connected to the actuator shaft can be in contact with the lever arm (but not directly connected to it) during the opening stroke so the lever arm turns or rotates about the pivot shaft at the pre-set (adjustable) speed of the electric motor. The lever arm can be keyed to the same valve shaft or pivot shaft that the disc is connected to inside the valve such that the disc can only rotate to the open position at the speed setting of the electric motor, even though, in various embodiments, the disc is not directly driven. The pump pressure provides the opening force to move the disc from a closed position to an at least partially open position. The electric motor can control the opening speed. As the disc opens the fluid is gradually accelerated minimizing surge pressure (water hammer) on pump start.

Upon a normal pump shutdown command, the check valve can begin to close at a controlled rate while the upstream pump continues to run. In order to limit pressure surge, the check valve can slowly close prior to the pump shut down to gradually decelerate the fluid. The electric motor can overcome the fluid force acting on the face of the disc and can force the disc to the closed position. The check valve can control the deceleration of the fluid and thereby minimizes pressure surges (water hammer) as the valve completes its controlled closing movement. When the valve reaches the closed position, a limit switch on the on the motor can trip and turn off the pump.

If a sudden loss of pump pressure occurs during pump operation such as a power failure or other pump failure, the flow can reverse direction. A power failure can also cause the electric motor operator to fail in its last position such that it would be unable to close the valve. However, the reverse flow acting on the back of the disc can close the valve because the disc can be free to swing to the closed position because it is not directly coupled to the electric motor, allowing the disc to rotate freely from rotation of the motor. Backflow through the pump, flooding of the sump, and draining of the line can be at least partially prevented as the valve closes. The external lever arm and counter weight can minimize slam during this rapid emergency closure and optional bottom buffers and side mounted compression elements are also available for additional slam and water hammer protection.

Referring now to the figures, FIG. 1 shows a partial cutaway perspective view of an example check valve 100. The check valve 100 includes a valve body 102. The valve body 102 provides a housing or structure for the valve. The valve body 102 is connected to other components of the valve 100. The valve body 102 defines an inlet port 104 and an outlet port 106. The inlet port 104 refers to portion of the valve 100 where fluid enters when the fluid is traveling in the normal direction, thereby forcing the disc 108 to at least partially open position. The outlet port 106 refers to the portion of the valve that fluid exits the valve 100 through when the fluid is traveling in the normal direction. The inlet port 104 is in fluid communication with the outlet port 106 when the disc 108 is at least partially open such that fluid can flow into the inlet port 104 and out of the outlet port 106.

The disc 108 is disposed within the valve body 102. In various embodiments, the disc 108 is disposed adjacent to the inlet port 104. The disc 108 can also be disposed elsewhere along the fluid path from the inlet port 104 to the outlet port 106. The disc 108 is generally configured to rotate from a closed position to an open position. When rotating from a closed position to an open position, the disc 108 rotates away from the inlet port 104. In a closed position, the front face of the disc 108 can be substantially perpendicular to the flow of fluid through the valve 100, such as to substantially stop or prevent the flow of fluid through the valve.

In a closed position, the disc 108 is typically located against the valve body 102 that defines the inlet port 104. In various embodiments the valve body 102 prevents the disc from rotating to a position that is past the completely closed position. In a completely open position, the front face of the disc 108 may be removed from the flow of fluid through the valve 100, such as to not impede or restrict the flow of fluid through the valve 100. In example embodiments in a completely open position the disc 108 is parallel to the flow of fluid through the valve 100.

The disc 108 can be biased towards the closed position, such that when no external forces are acting on the disc 108, the disc 108 will be in the closed position to prevent flow (in particular back flow). The disc 108 can be biased towards the closed position with the use of a spring, a weight, or other device that provides a closing force, while in other embodiments the disc 108 is biased towards the closed position without the use of a spring or other device that provides a closing force. In some embodiments, the disc 108 can be hydraulically balanced.

In various embodiments, the inlet port 104 can have a diameter of at least 1 inch and not more than 84 inches. In various embodiments, the outlet port 106 can have a diameter of at least 1 inch and not more than 84 inches. In example embodiments the inlet port and outlet port have a diameter of 1 to 84 inches, of 2 to 42 inches, and 4 to 21 inches. In some embodiments the inlet port and outlet port have a diameter greater than 1 inch, greater than 2 inches, or greater than 4 inches. In some embodiments the inlet port and outlet port have a diameter of less than 84 inches, less than 42 inches, or less than 21 inches.

In various embodiments, the check valve 100 includes a lever arm 110 that allows for control of the opening and closing functions of the check valve. The lever arm 110 is typically external to the valve body 102. The lever arm 110 in the depicted embodiment is coupled to the disc 108 through a pivot shaft 112. The lever arm 110 is coupled to the disc 108 such that when the disc 108 rotates with the pivot shaft 112, the lever arm 110 also rotates. The lever arm 110 typically includes a counter weight, such as to keep the disc 108 biased towards a closed position. In some embodiments, the disc 108 and lever arm 110 can be biased towards a closed position with a spring. In various embodiments, the lever arm 110 rotates the same amount of degrees as the disc 108. For example, if the disc rotates 15 degrees away from the closed position, the lever arm 110 also rotates 15 degrees. The pivot shaft 112 can be keyed with the disc 108 and the lever arm 110, such that as the disc 108 rotates, the pivot shaft 112 and the lever arm 110 also rotate. The pivot shaft can further be coupled to a compression element 120. In an embodiment, instead of a pivot shaft, a linkage can couple the lever arm 110 to the disc, such as to transfer rotation from one component to the other.

The ability to open and close the disc 108 can be controlled by a rotatable actuator shaft 116. The lever arm 110 can be configured to contact a first interference element 118, such as to prevent the disc 108 from opening any further. A motor 114 is optionally configured to drive or rotate at least a portion of the actuator shaft 116. The actuator shaft 116 is coupled to the motor 114 in the depicted embodiment such that the motor 114 can drive or rotate at least a portion of the actuator shaft 116. In various embodiments, the actuator shaft 116 moves longitudinally along it axis as the shaft rotates. The motor 114 typically operates at a controlled and adjustable rate of speed, such as control the speed at which the actuator shaft 116 moves.

The interference element defines a hard stop that prevents the lever arm 110 from further movement in a given direction. In an embodiment, the first interference element 118 can be a protrusion that extends from the actuator shaft 116 that the lever arm 110 can abut against when the disc 108 is in the maximum open position. In an example embodiment, the first interference element 118 can include a roller, such as cylinder that can roll along the lever arm 110 as the lever arm 110 comes into contact with the first interference element 118. In an embodiment, a roller can include a cylinder that rotates around an axis of an axle. In an embodiment, the axle can be fixed, such that it does not rotate. In an embodiment, the axle can extend perpendicular from the actuator shaft 116. In other embodiments, the first interference element 118 is a stationary protrusion or extension extending from the actuator shaft 116. The first interference element 118 can be stationary, such that it is in a fixed location and configuration along the actuator shaft 116 and the actuator shaft 116 can translate along a longitudinal axis to change the maximum open position.

The actuator shaft 116 can include an anti-rotation element, such that a first portion of the actuator shaft 116 can rotate without a second portion of the actuator shaft 116 rotating. A first interference element 118 can be coupled to the actuator shaft 116, such as along the portion of the actuator shaft that does not rotate to keep alignment between the interference element 118 and the lever arm 110. In an alternative embodiment, the actuator shaft 116 can include an anti-rotation element, such that the actuator shaft 116 will not rotate but will move in the direction of its axis as the electric motor rotates a threaded coupling on the threaded portion of the actuator shaft 116.

As the motor drives the actuator shaft the first interference element moves along an axis that can be perpendicular to the flow of fluid from the inlet port to the outlet port. The lever arm 110 rotates freely away from the first interference element 118, such as to at least partially close the valve upon the simultaneous loss of power in an upstream pump or decrease in flow resulting in a decrease in pressure on the front face of the disc 108.

The location of the first interference element 118 defines the maximum open position of the disc 108. Changing the location of the first interference element 118 can change the maximum open position of the disc 108. As shown in FIG. 1, a higher location (closer to the motor 114) of the first interference element 118 will allow the disc 108 to open more than a lower location.

In various embodiments, the check valve can include one or more elements to prevent the disc 108 from slamming into the valve seat 122 by rapidly reversing the direction of flow through the valve during a non-controlled closure. The check valve 100 can include a compression element 120 to prevent the disc 108 from slamming into the valve 122. The compression element 120 can provide a force against the disc 108 moving in a direction from an open position to the closed position or a cushion to minimize any rapid closure of the valve 100. In an embodiment, the compression element 120 can include an air piston and/or a counterweight. In an embodiment, the compression element 120 can include a spring or a piston, such as a hydraulic piston, an oil piston, or a pneumatic piston.

In various embodiments, the check valve 100 can include a valve seat 122. In various embodiments the valve seat 122 includes a soft polymeric or elastomeric material, bronze, aluminum bronze, stainless steel, or other corrosion resistant materials including coatings and plating. The valve seat 122 can provide a seal between the disc 108 and the valve body 102 when the disc 108 is in a closed position, such as to substantially prevent any fluid from passing through a gap between the disc 108 and the valve body 102. The seat 122 can be at least somewhat soft, such that the seat 122 can form around a portion of the disc 108 or valve body 102 to provide a better seal. The valve seat 122 can encircle a portion of the fluid path from the inlet port 104 to the outlet port 106. When the disc 108 is in a closed position, the valve seat 122 can be sandwiched between the disc 108 and the valve body 102.

FIG. 1 shows a partial cutaway perspective view of a check valve 100 with a disc 108 in a closed position. As discussed above, in a closed position, the disc 108 abuts against the valve seat 122 and the valve body 102 at the inlet port 104. In FIG. 1, the disc 108 is set in a closed position by the lever arm 110 abutting against the first interference element 118, and the valve is not able to open because the interference element 118 on the actuator shaft 116 prevents the lever arm 110 from rotating upward (in a clockwise rotation as drawn). Thus, FIG. 1 shows a check valve 100 in a closed position that is not able to open unless the interference element 118 is moved upward by rotation of the actuator shaft 116.

Figure 2:
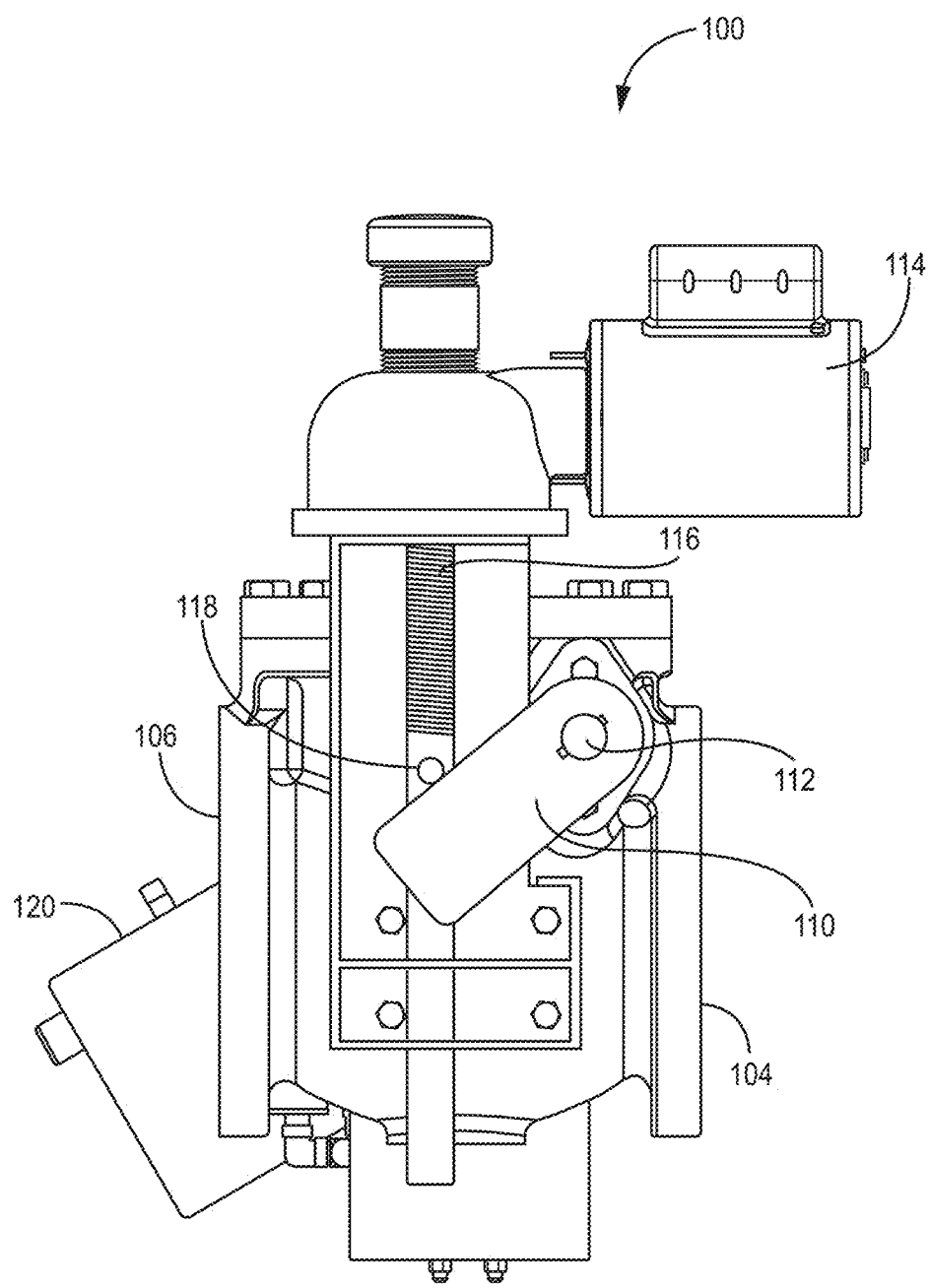
FIG. 2 is a partial side view of an actuator on a check valve, according to an embodiment.

FIG. 2 shows a partial cutaway side view of a check valve 100 with the disc 108 in the same location as shown in FIG. 1. FIG. 2 shows the first interference element 118 at a lower position along the axis of the actuator shaft 116. The valve 100 is completely closed in FIGS. 1 and 2. The position of the lever arm 110 against the interference element 110 prevents the lever arm 110 from further rotating in a clockwise position, and thereby prevents the disc 108 from opening.

Figure 3:
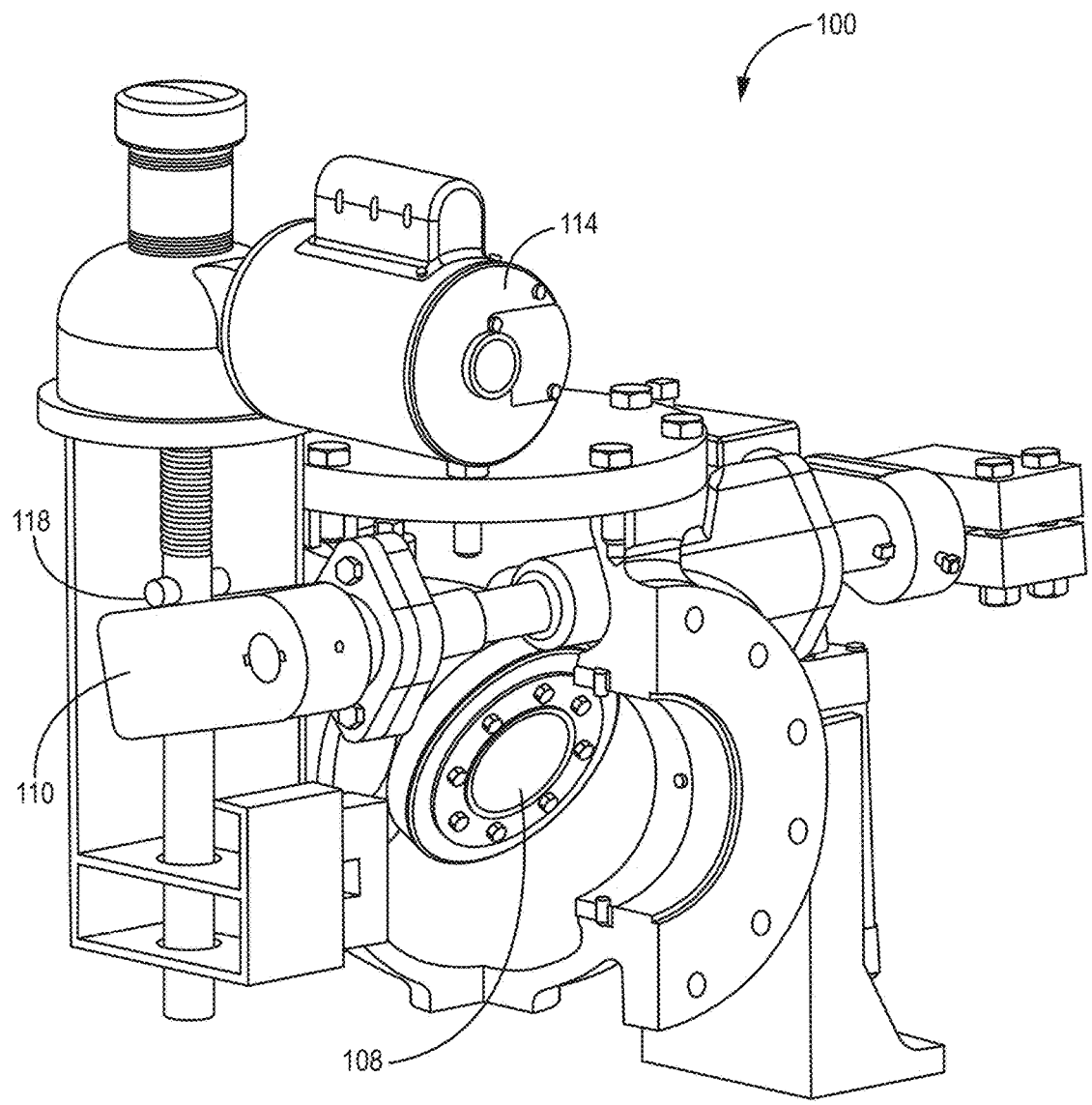
FIG. 3 is a partial cutaway perspective view of a partially open check valve, according to an embodiment, with an interference element holding the valve disc (not shown) in a closed or partially closed position

FIG. 3 shows a partial cutaway perspective view of check valve 100 with the disc 108 in a partially open position made possible by raising of the interference element 118 as the actuator shaft 116 was rotated (typically by a motor). In FIG. 3, the disc 108 is at its greatest open position relative to the location of the interference element 118 because the lever arm 110 is abutting against the interference element 118. However, the disc 108 is not at a completely open position, because the first interference element 118 can still be raised or moved to a position that would allow the disc 108 to be more open. Thus, in FIG. 3 the disc 108 can freely move (depending upon forces) from the partially open position shown to a partially or completely closed position by rotation of the disc downward. This position shown in FIG. 3 is useful, for example, when fluid is initially flowing into a system (such as a pipeline) to allow for a reduced initial flow while still allowing backflow prevention functionality.

Figure 4:
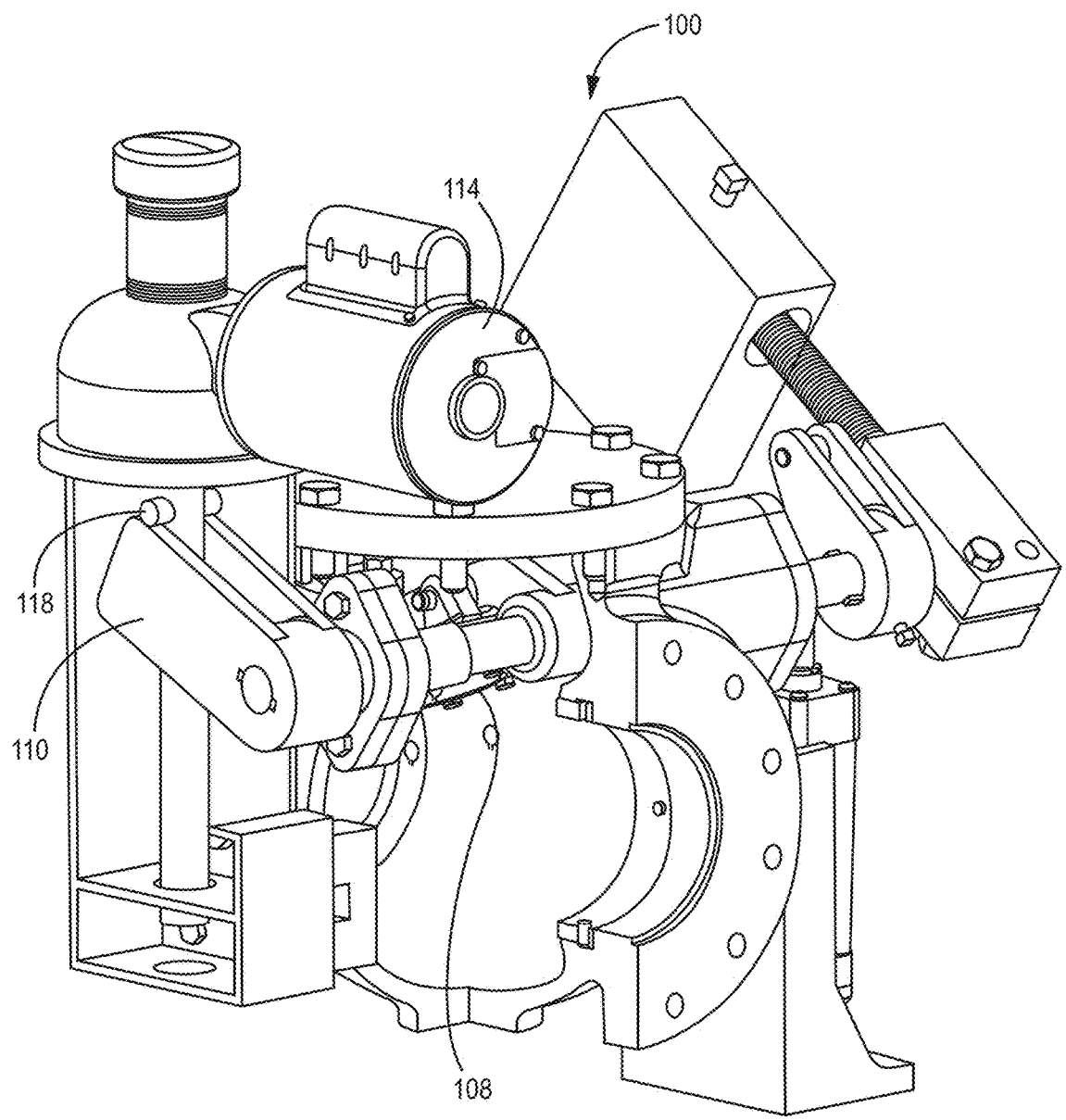
FIG. 4 is a partial cutaway perspective view of a completely open check valve, according to an embodiment, with the valve disc rotated out of view into an open position.
Figure 5:
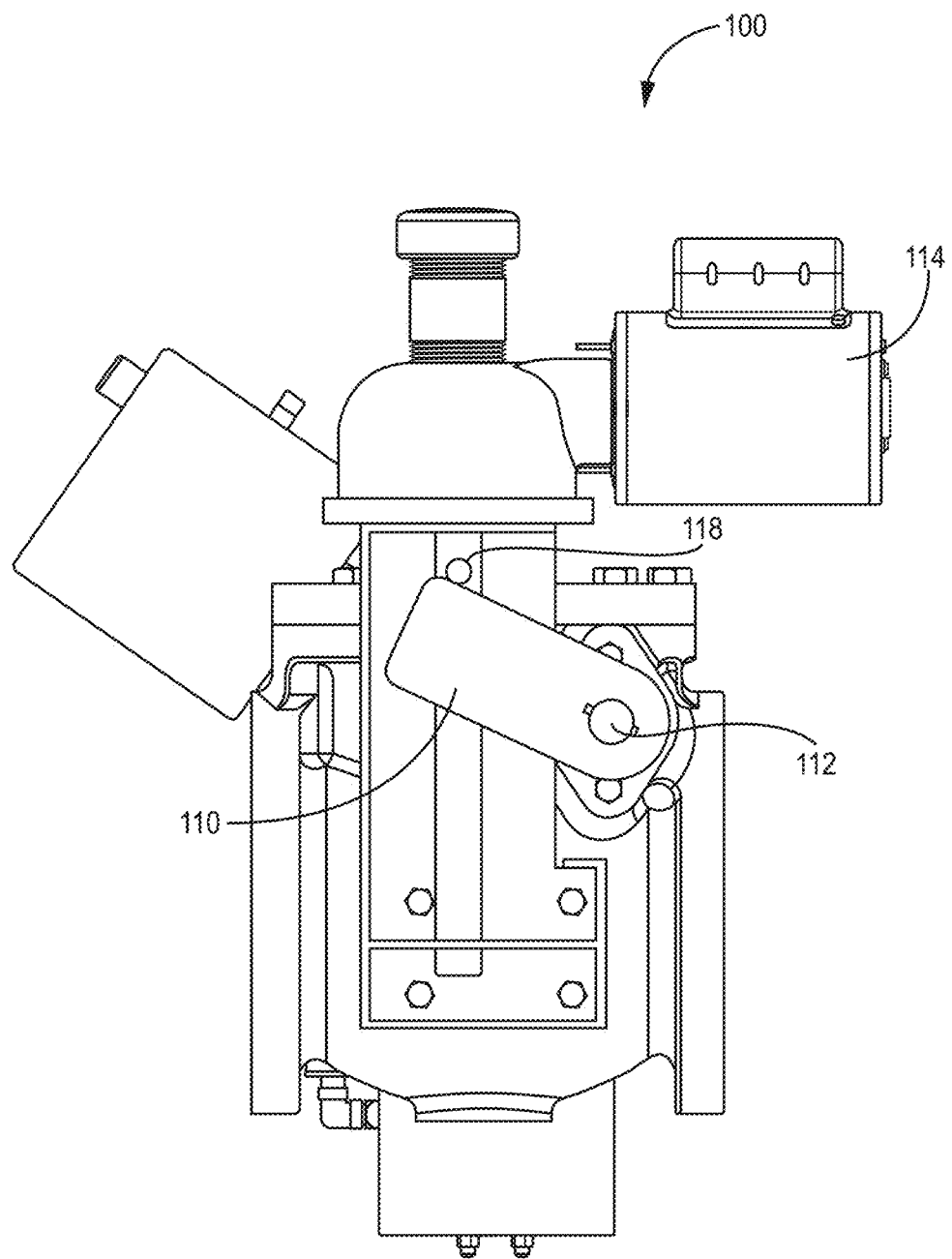
FIG. 5 is a partial side view of an actuator on a check valve, according to an embodiment, with the valve disc (not shown) in an open position.

FIGS. 4 and 5 show the disc 108 in a maximum open position that is also the completely open position, this maximum position made possible by further rotation of the actuator shaft to raise the interference element 118. FIG. 4 shows a partial cutaway perspective view of the check valve 100. FIG. 5 shows a side view of the check valve 100 with the disc 108 in the same position as FIG. 4. In FIGS. 4 and 5 the interference element 118 is in the top most position which allows the lever arm 110 to rotate as much as possible thereby allowing the disc 108 to open completely. The check valve 100 of FIGS. 4 and 5 would typically to have a fluid flowing through the valve 100 at a pressure high enough to keep the disc 108 in the completely open position and the lever arm 110 abutting against the first interference element 118. Upon stopping of fluid flow the pressure keeping the disc 108 open diminishes and the disc 108 can rotate closed, since the interference element 118 does not prevent closing of the valve, only opening of the valve.

Figure 6:
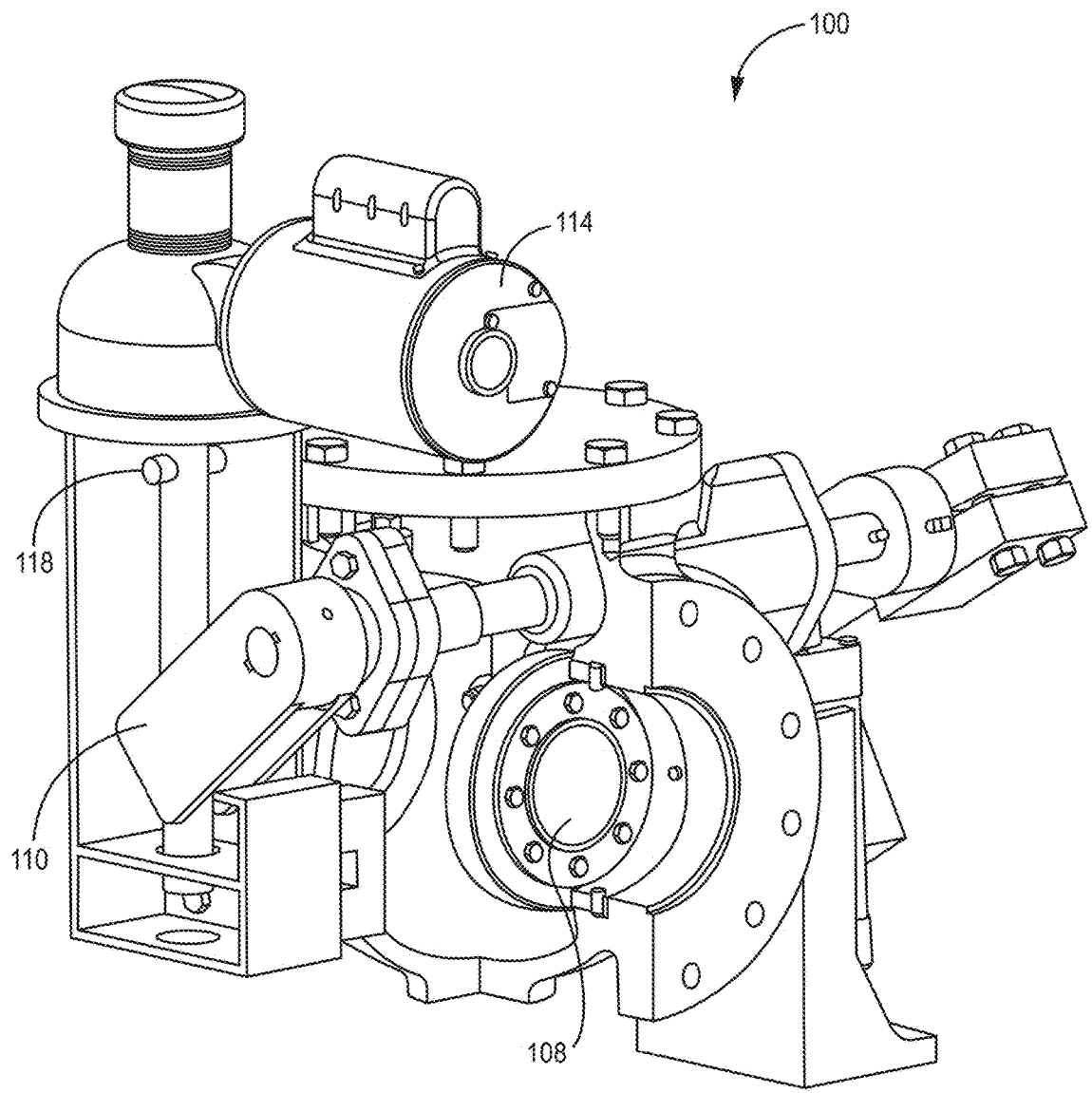
FIG. 6 is a partial cutaway perspective view of a check valve, according to an embodiment, showing the valve closed by the valve disc, although the valve disc is free to rotate into an open position.
Figure 7:
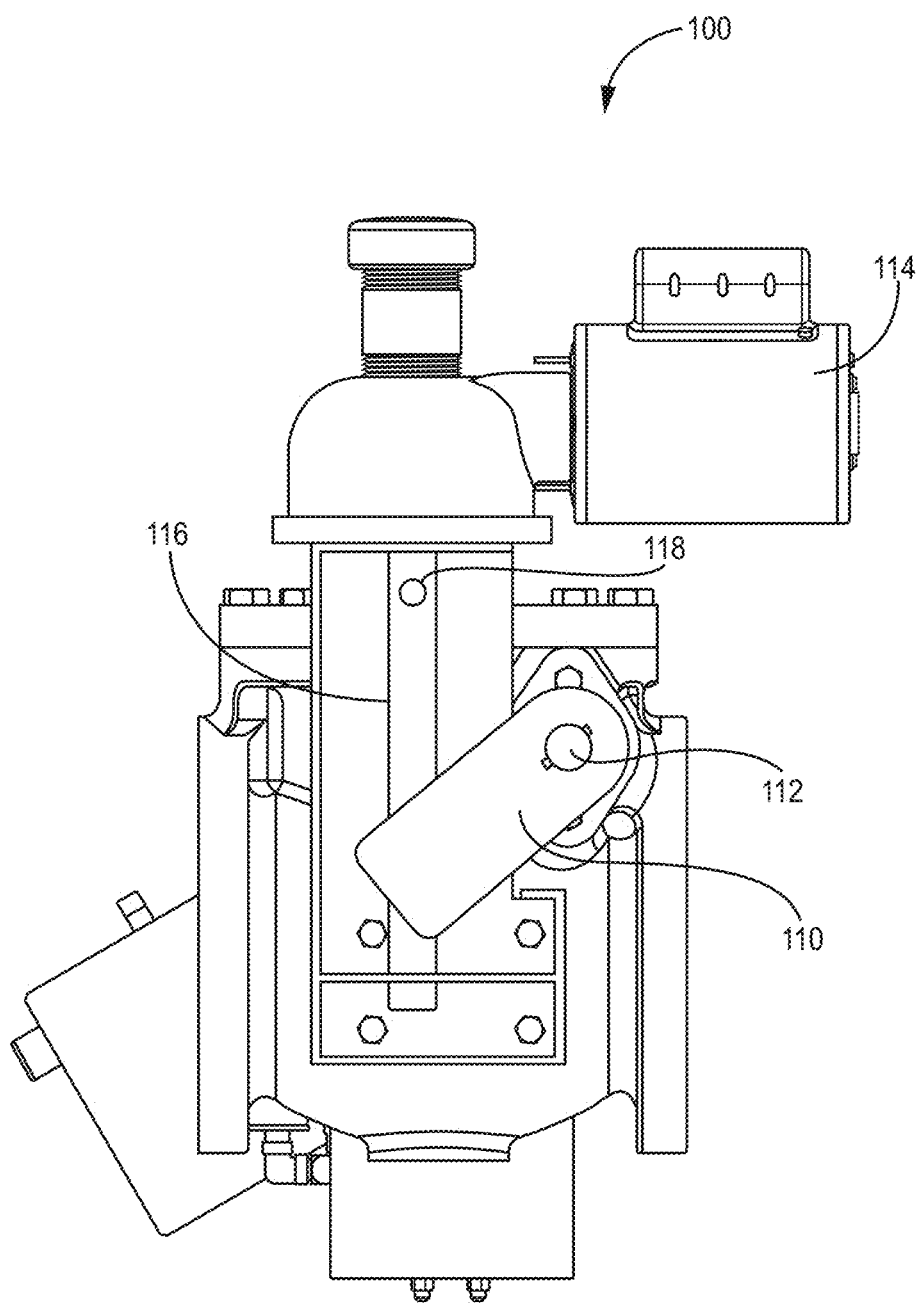
FIG. 7 is a partial cutaway side view of a check valve actuator, according to an embodiment.

FIGS. 6 and 7 show the valve 100 with the disc 108 in a closed position. The location of the interference element 118 is the same as that shown in FIGS. 4 and 5. FIG. 6 shows a partial cutaway perspective view of the check valve 100. FIG. 7 shows a partial cutaway side view of the check valve 100. The valve 100 shown in FIGS. 6 and 7 can be the result of backflow through the valve 100 closing the disc 108. The first interference element 118 is still in the position that would allow for the disc 108 to be in the completely open position if flow through the valve 100 was sufficient to open the disc 108 and keep the disc 108 in the completely open position. The valve 100 shown in FIGS. 6 and 7 can be the result of decreased flow resulting in insufficient pressure to keep the disc 108 in an open position, such as would occur upon loss of electrical power to an upstream pump.

Figure 8:
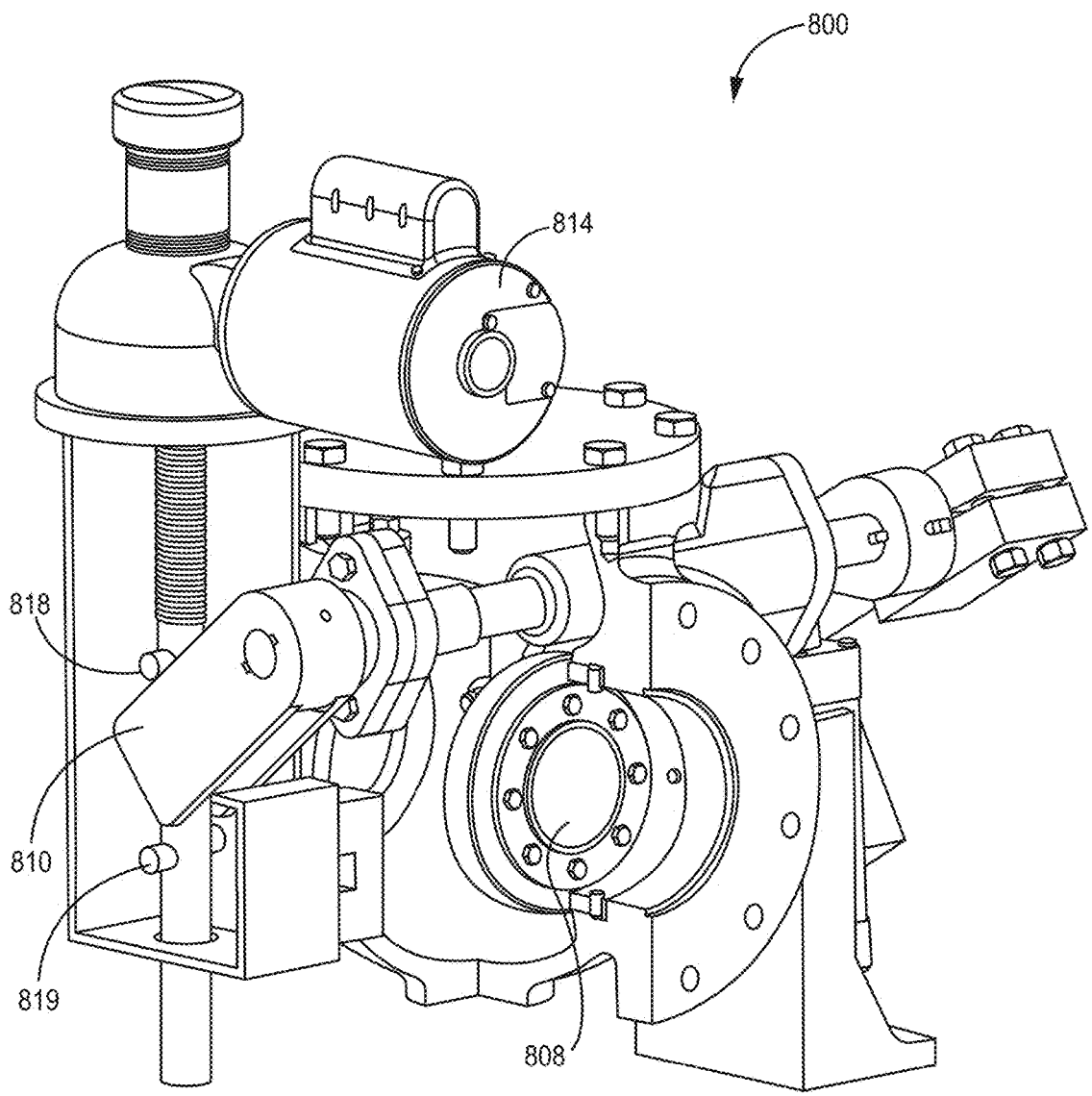
FIG. 8 is a partial cutaway perspective view of a check valve, according to an embodiment, showing the check valve in a closed position.

The check valve 100 can include a second interference element, such as shown in FIG. 8. The second interference element is also shown coupled to the actuator shaft 116. The second interference element is located on the opposite side of the lever arm 110 from the first interference element 118, such as the first interference element 118 being located above the lever arm 110 and the second interference element being located below the lever arm 110. The second interference element is located below the lever arm 110 and a distance away from the lever arm 110, such that the second interference element does not contact the lever arm 110 during normal operation of the valve 100. The second interference element can be used to force the lever arm 110 in a direction that results in moving the disc 108 to a more open position. Defining a maximum closed position that is partially open can allow the piping system in which the valve 800 is part of to be drained. The second interference element 819 can also be used to force the disc 808 open by exerting a force on the lever arm 810 to push or lift the lever arm 810 by moving the second interference element 819 thereby at least partially opening the disc 808.

In various scenarios, it may be desired to open the disc 808 when there is not any fluid pressure to open the disc 808 or the fluid pressure is insufficient to overcome the bias of the disc 808 towards the closed position. In such scenarios the motor 814 can move the second interference element 819 against the lever arm 810 to move or force the lever arm 810 into an at least partially open position. In some embodiments, the second interference element 819 can move the lever arm 810 into a position that corresponds to a completely open position of the disc 808.

Figure 9:
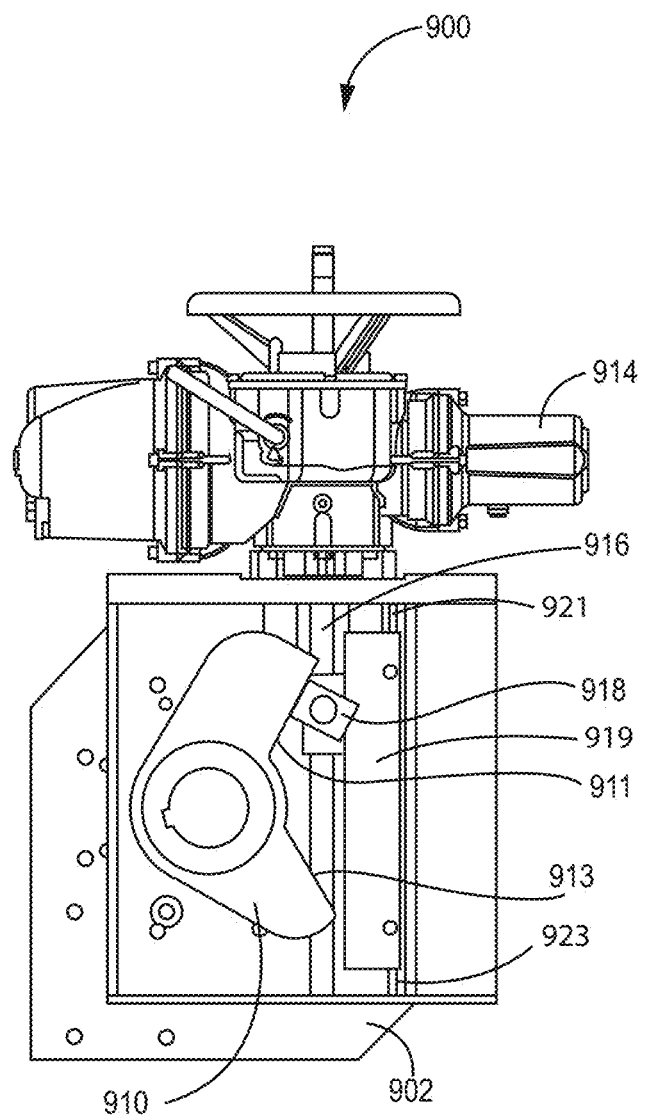
FIG. 9 is a partial cutaway side view of a check valve, according to an alternative embodiment, showing the valve in a closed position (and wherein the valve is not free to open again).

FIGS. 9-13 show a second embodiment of a check valve 900. The check valve 900 includes a valve body 902, a disc inside the body (not shown), a lever arm 910, a pivot shaft connected to the disc (not shown), a motor 914, an actuator shaft 916 and an interference element 918. The interference element is typically a rotatable member, such as a rotatable nut, mounted on the actuator shaft 916. Fluid would typically flow through an inlet on the right side of the valve 900 to the left side of the valve 900 as depicted in FIG. 9. An interference element 918 engages a lever arm 190 to control the opening and closing of the valve disc.

Figure 10:
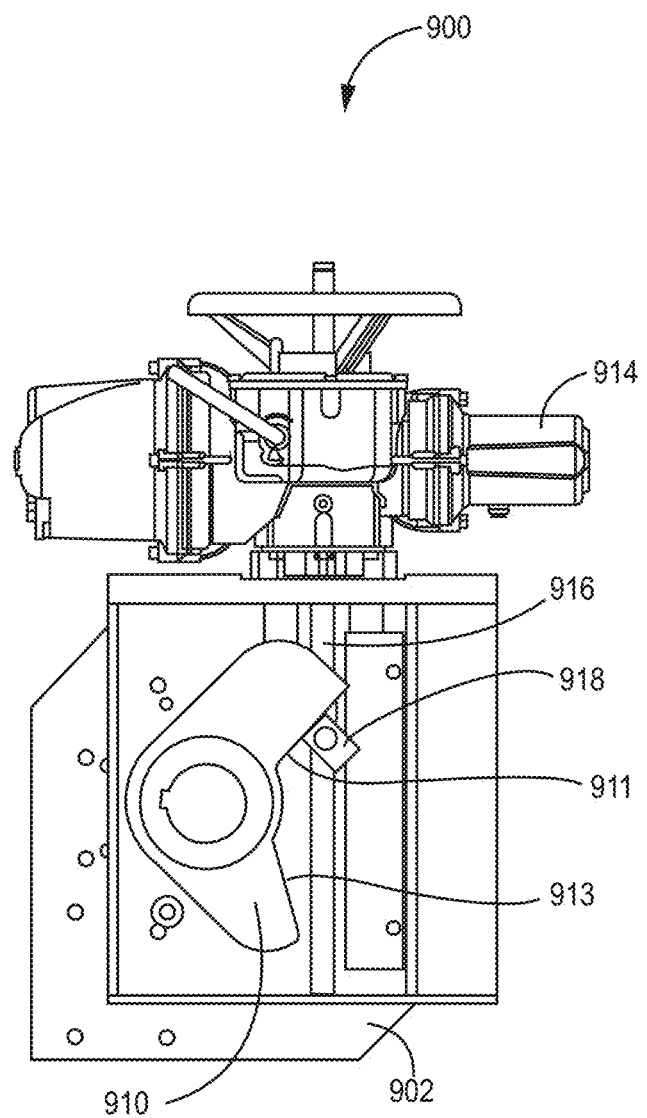
FIG. 10 is a partial cutaway side view of a check valve, according to an embodiment, showing the valve in a partially open position.
Figure 11:
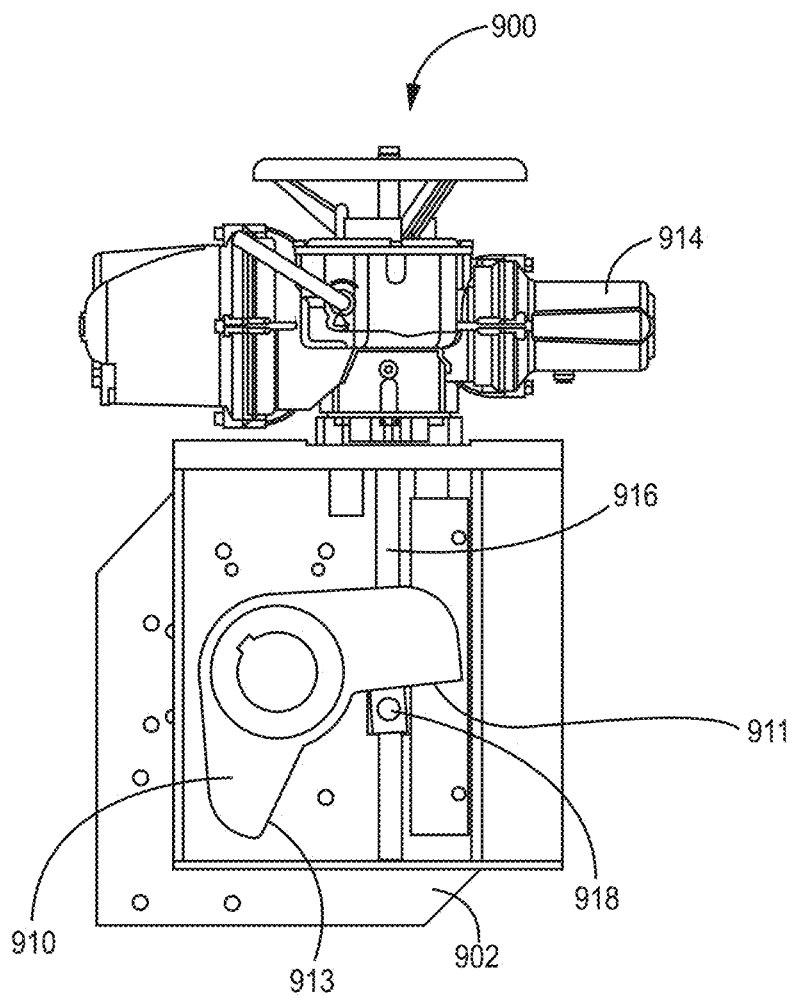
FIG. 11 is a partial cutaway side view of a check valve, according to an embodiment, showing the valve in an open position.
Figure 12:
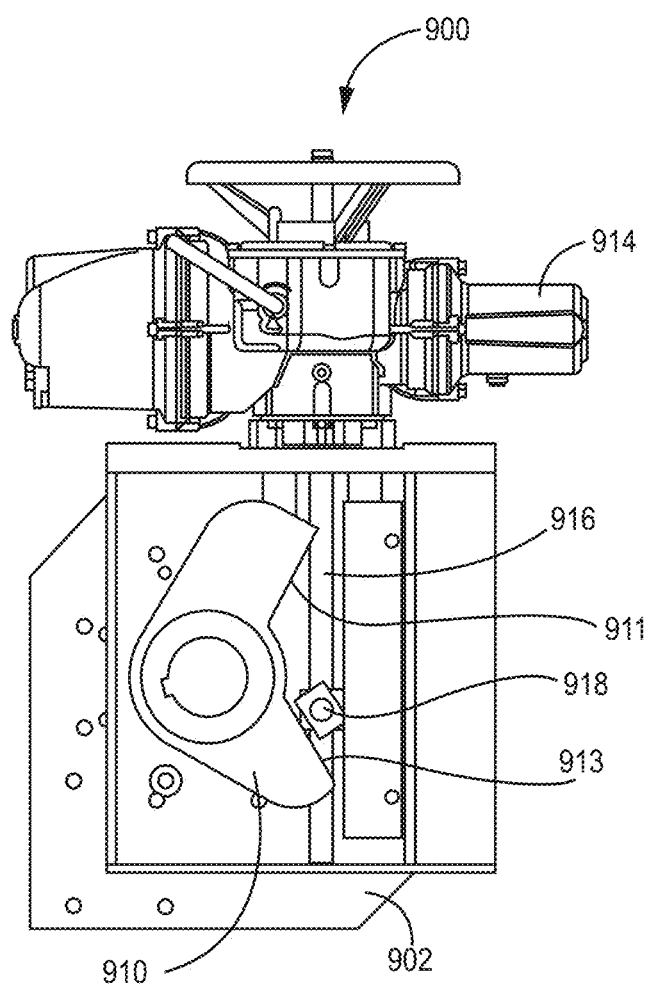
FIG. 12 is a partial cutaway side view of a check valve, according to an embodiment, showing the valve in a closed position (but wherein the valve is free to open again).
Figure 13:
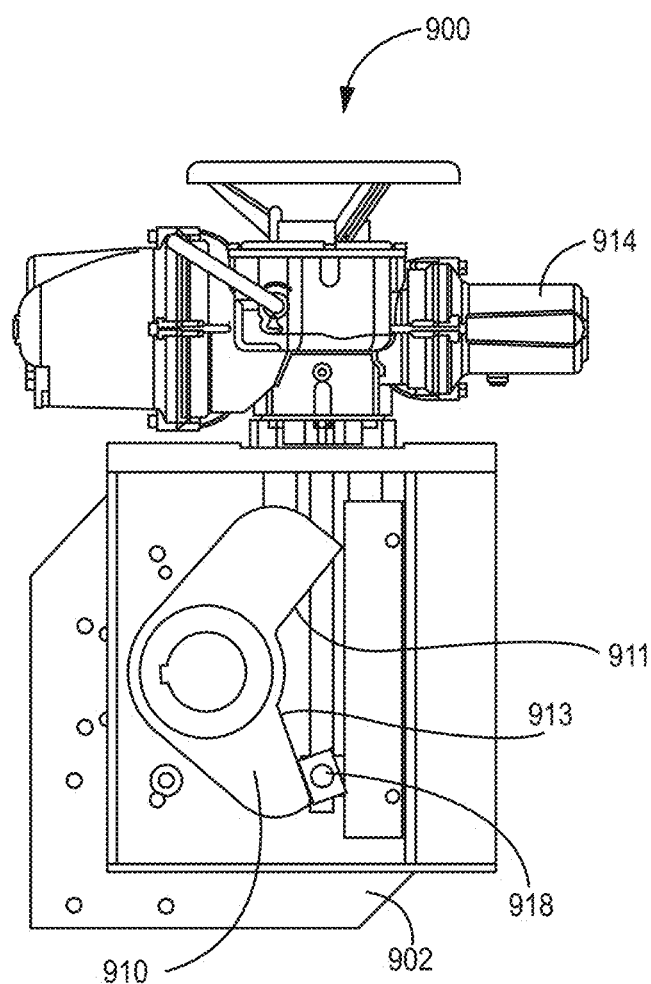
FIG. 13 is a partial cutaway side view of a check valve, according to an embodiment, the valve forced into a partially open position so as to drain fluid from upstream of the valve.

FIGS. 9-13 show various positions for the check valve 900. FIG. 9 shows the check valve 900 in a completely closed configuration such that fluids do not pass through the valve (the disc is inside the valve, and thus not depicted, but would be in a position such that the disc face is rotated down and positioned against the valve seat at the valve inlet. FIG. 10 shows the check valve 900 in a partially open configuration where the disc is between a completely open position and a completely closed position. FIG. 11 shows the check valve 900 in a completely open position. FIG. 12 shows the check valve 900 with an interference element in a completely open position and the lever arm 910 and disc in a closed position. Thus, in FIG. 12 the valve is closed although the interference element and lever arm 910 are in an open position, allowing the valve to open again upon exposure to fluid flow. FIG. 13 shows the check valve 900 with the interference element 918 driving the lever arm 910 into an at least partially open position, such as to overcome the biasing of the disc into the closed position direction when there is not any or not sufficient upstream fluid pressure to open the disc. FIG. 13 allows the valve to be drained.

Referring now to these drawings in more detail, FIG. 9 is a partial cutaway side view of the check valve 900, according to an embodiment, showing the valve in a completely closed configuration. In the embodiment shown in FIG. 9, the disc (not shown), lever arm 910, and interference element 918 are all in the completely closed position. In this completely closed position, the disc substantially prevents fluid from flowing through the valve 900. In a closed configuration the lever arm 910 is at its rotational extreme, such as in the counter clockwise (as shown in FIG. 9) direction. In the closed configuration shown in FIG. 9, the disc and lever arm 910 are prevented from moving to a more open direction (clockwise) by the interference element 918. The motor 914 and actuator shaft 916 control the position of the interference element 918. The interference element 918 is shown in FIG. 9 in its completely closed position, such that when the lever arm 910 contacts the interference element 918 the disc remains in its closed position.

The lever arm 910 is coupled with the disc such that when the disc rotates the lever arm 910 rotates and when the lever arm 910 rotates the disc rotates. Movement of the interference element 918 into a lower location (farther from the motor 914) by rotation of the actuator shaft (which is threaded, the threads not depicted) allows the disc to open. In various embodiments, the disc and the lever arm 910 can be biased into the closed position, such that without any external forces the disc will be in the closed position if not prevented by the lever arm 910 and interference element 918.

Further, the lever arm 910 includes a first interference element contact surface 911 and a second interference element contact surface 913. The interference element 918 makes contact with surface 911 and 913 so as to control rotation of the lever arm 910 and thereby the disc. When the first interference element contact surface 911 is in contact with the interference element 918, the disc is prevented from moving into a more open position. The second interference element contact surface 913 prevents the disc from becoming more closed. Specifically, when the second interference element contact surface 913 is in contact with the interference element 918 the disc can be prevented from moving into a more closed position.

Also, as shown in FIG. 9, the interference element 918 optionally travels along a guide bar 919. The guide bar 919 helps align the interference element 918, and also prevents it from rotating as it travels along the actuator shaft 916. The guide bar 919 is typically a rectangular element. In example embodiments the guide bar 919 can rotate slightly along vertical pins 921 and 923, which allow for relief of mechanical stress that can develop as the interference element 918 travels up and down along the actuator shaft 916.

FIG. 10 shows the check valve 900 in a partially open configuration. In the embodiment shown in FIG. 10, the disc, lever arm 910 and the interference element 918 are all in a partially open position, such as at a position that is between a completely open position and a completely closed position, where the completely open and completely closed positions are defined by the mechanical limitations of the check valve 900. The lever arm 910 can move in a counterclockwise position so as to move the disc into a more closed position, but the lever arm 910 engages the interference element 918 at surface 911, and this prevents the lever arm 910 and disc from rotating clockwise into a more open position than that shown in FIG. 10. It is possible for the interference element 918 to move into a more open or more closed position by rotation of the actuator shaft 916 to further control the ability of the lever arm 910 (and thereby the disc) to rotate. For example, it is possible for the disc and lever arm 910 to move into a more open position by having the interference element 918 move down along the actuator shaft 916. Such movement of the interference element 918 down along the actuator shaft 916 allows greater rotational movement of the lever arm 910 and the disc into a more open position, while still preserving the ability of the disc to close if there is a lack of forces keeping it open (such as from an unexpected loss of pressure from a power failure).

Now referring to FIG. 11, the disc in FIG. 11 is in a maximum open position. In the configuration shown in FIG. 11, the upstream fluid pressure is sufficiently strong enough to overcome the biasing of the disc and lever arm 910 into a closed position. FIG. 11 shows the lever arm 910 being prevented from further opening the disc because the lever arm 910 cannot rotate in the opening direction due to the contact between the first interference element contact surface 911 of the lever arm 910 with the interference element 918, however the disc is already fully open and is typically stopped by other forces as well (such as the interior of the valve body)

FIG. 12 shows the configuration for normal pump shut down. Upon emergency loss of power to the pump, the valve automatically closes even though the motor and interference element 918 are in an open position. Thus, FIG. 12 shows the check valve 900 with the lever arm 910, the disc, in a closed position, and the interference element 918 in an open position. In the embodiment shown in FIG. 12, the motor 914 has positioned the interference element 918 into a position that allows the lever arm 910 and disc to rotate into a completely open position, such that the contact surface 911 would make contact with the interference element 918, however a lack of fluid flow causes the lever arm 910 to rotate such that the disc is closed. Thus, FIG. 12 further shows, the lever arm 910 and disc in the closed position, even though the actuator shaft 916 and interference element 918 are in an open position. As stated above, without any upstream fluid pressure or without sufficient upstream fluid pressure, the disc and lever arm 910 will remain in a closed position. The disc and lever arm 910 are biased into a closed position.

In normal operation the upstream fluid pressure must overcome the biasing force to open the disc. In the configuration shown in FIG. 12 the disc and lever arm 910 are closed, but the interference element 918 is in an open position. This situation can occur when the upstream fluid pressure is not sufficient to overcome the force biasing the disc and lever arm 910 into a closed position, such as when an upstream pump has just been turned ON and has not created sufficient upstream pressure on the disc. This situation can also occur if the downstream fluid pressure is larger than the upstream fluid pressure resulting in a pressure differential that causes a back flow. The pressure differential can be a result of an emergency loss of power to an upstream pump or the failure of an upstream pump.

In the embodiment shown in FIG. 13, the disc is forced into a partially open configuration such as to drain fluid from the adjacent sections of piping or conduit. As discussed above, the lever arm 910 and disc are biased into a closed position. Without an outside force, such as upstream fluid pressure, the lever arm 910 and disc can remain in the closed position regardless of the position of the interference element 918. In some instances, it can be desirable to partially open the disc when the upstream pressure is insufficient to overcome the biasing force. In such instances, the interference element 918 can be driven by the actuator shaft into an open position by the motor 914. The interference element 918 can be driven into contact with the second interference element contact surface 913 of the lever arm 910. The interference element 918 is further driven, with a force to overcome the biasing force into a more open position causing the lever arm 910 and disc to rotate into a more open position. Force from the interference element 918 against the second interference element contact surface 913 allows the disc to be opened when there is insufficient upstream fluid pressure to open the disc.

Figure 14:
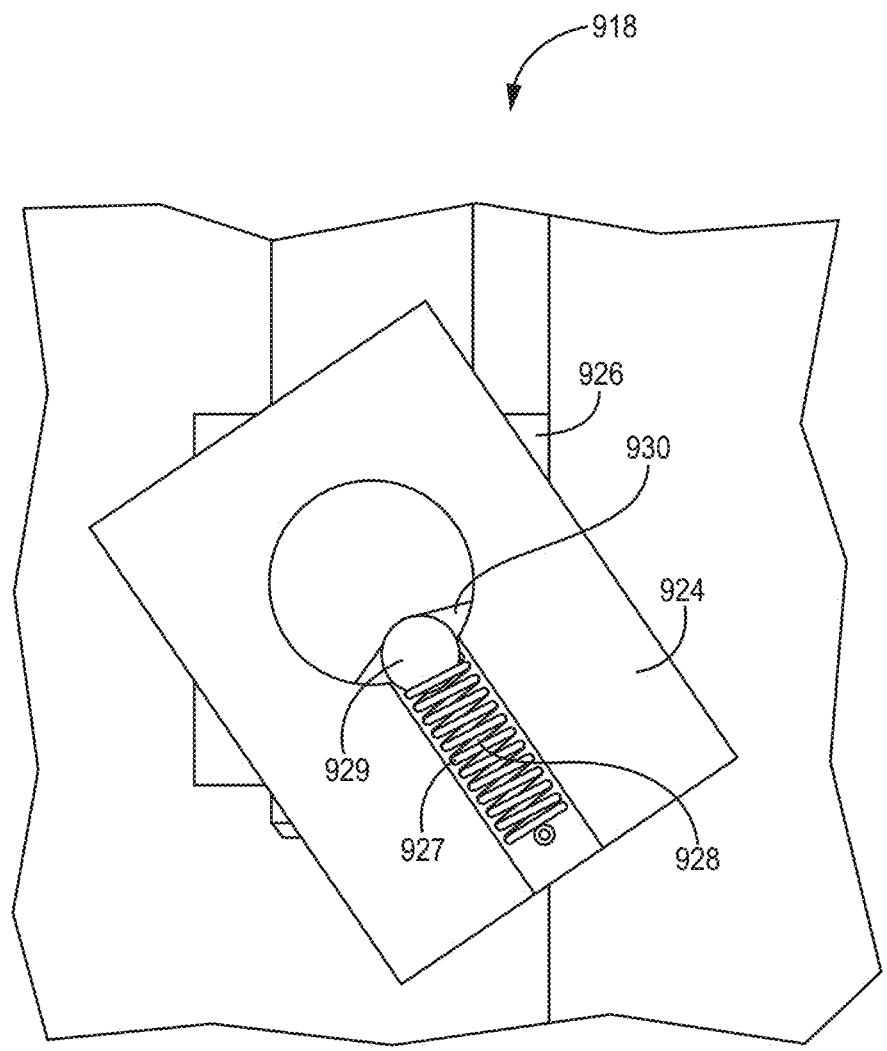
FIG. 14 is a cutaway view of an interference element, according to an embodiment.

FIG. 14 is a cutaway view of an interference element 918, according to an embodiment. In an embodiment, the interference element 918 can include a rotatable element 924, a fixed component 926 and a detent mechanism 927. The fixed component 926 can be in a fixed alignment relative to the actuator shaft or the valve body 902, such that the fixed component 926 does not rotate relative to the actuator shaft or the valve body 902. The rotatable element 924 can have one or more lever arm contact surfaces. In an embodiment, the rotatable element 924 includes a first lever arm contact surface configured to contact the first interference element contact surface 911 of the lever arm 910 and the second lever arm contact surface is configured to contact the second interference element contact surface 913 of the lever arm 910. In an embodiment, the first lever arm contact surface can be perpendicular to the second lever arm contact surface.

The rotatable element 924 can rotate to ensure the first lever arm contact surface and/or the second lever arm contact surface are aligned with the respective surface of the lever arm 910 when contact is made between the two components. In an embodiment, a detent mechanism 927 is configured to prevent or limit the range of rotational movement of the rotatable element 924, such as a range of 25 degrees.

Figure 15:
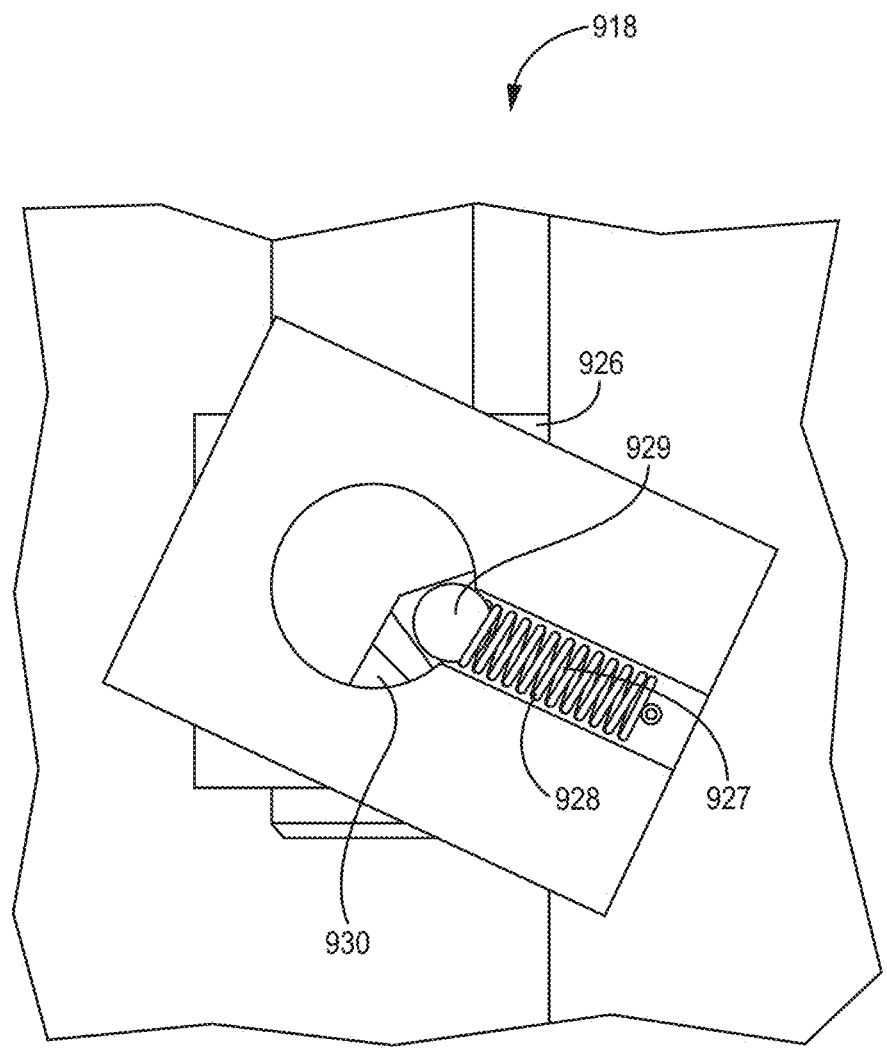
FIG. 15 is a cutaway view of an interference element, according to an embodiment.

In various embodiments, the detent mechanism 927 can include a spring 928 and a ball 929 to align the rotatable element 924. The fixed component 926 can define a ball recess 930 that the ball 929 can move within, such as to rotate the rotatable element 924. The spring 928 can bias the ball 929 into the ball recess 930. FIG. 14 shows the ball 929 in the middle of the ball recess 930, such that the rotatable element 924 can rotate in a clockwise direction the same amount as the rotatable element 924 can rotate in a counterclockwise direction. FIG. 15 shows the ball 929 in an extreme position, such that the rotatable element 924 cannot rotate further in the counterclockwise direction.

Figure 16:
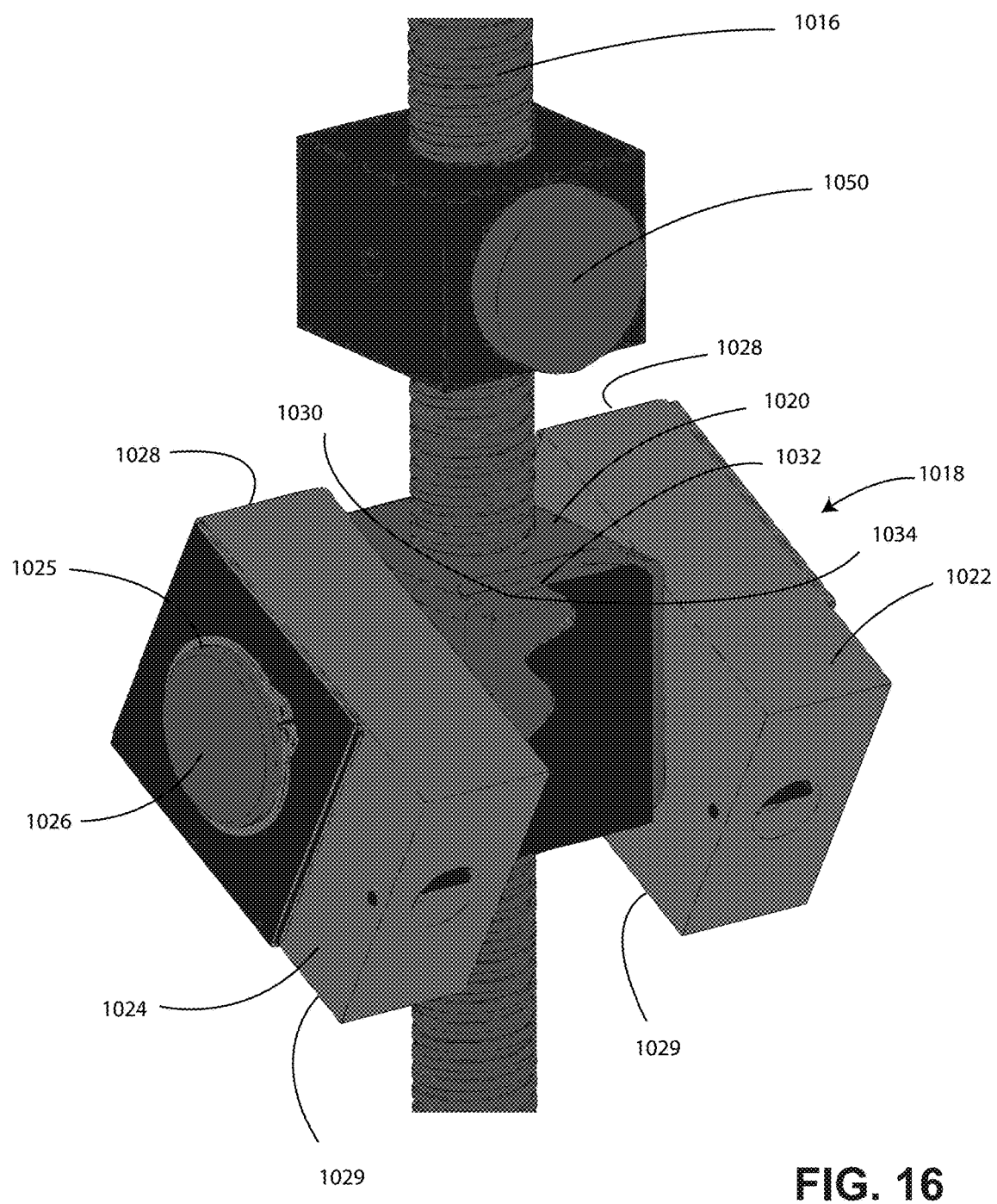
FIG. 16 is a closeup view of an interference element, according to an embodiment.

FIG. 16 is a closeup view of an interference element, according to an embodiment. The interference element 1018 travels up and down shaft 1016, which is threaded to allow the interference element to move up and down the shaft 1016 as the shaft rotates. The interference element 1018 does not rotate. A threaded interior of the interference element 1018 engages the threads of the shaft 1016 so that the interference element 1018 travels up and down upon rotation of the shaft 1016. In the depicted embodiment the interference element 1018 includes a central yoke nut 1020, along with guide nuts 1022 and 1024 on either side of the yoke nut. The guide nuts 1022 and 1024 are retained in place on transverse hub 1026, which is (optionally) an extension of the yoke nut 1020, but which allow the guide nuts 1022 and 1024 to rotate. Thus, the two guide nuts 1022 and 1024 can pivot along an axis formed by transverse hub 1026. The guide nuts 1022 and 1024 are retained in place by retaining rings 16.

The guide nuts 1022 and 1024 of the interference element 1018 each include surfaces 1028 and 1030 that are configured to engage the surfaces of the lever arms 911 and 913, respectively (see, e.g., FIGS. 9 and 13, showing the two surfaces 1028 and 1030 each respectively making contact with the first and second interference element contact surfaces 911 and 913).

The yoke nut 1020 of the interference element 1018 also includes a bearing 1030. The bearing 1030 includes a curved concave surface 1032 formed in the yoke nut 1020, along with a mating curved convex surface 1034 that fits into the concave surface 1032. This bearing 1030, including concave surface 1032 and convex surface 1034 allow for slight rotation of the yoke nut 1020 along the axis formed by the screw 1016 as the yoke nut 1020 travels up and down the guide bar (not shown). This slight rotation of the yoke nut 1020 (which also rotates the guide nuts 1022 and 1024) reduces resistance to travel of the interference element 1018 along the guide bar.

Also shown in FIG. 16 is a stop nut 1050 along with stay pin 1052. The stop nut 1050 limits movement of the interference element 1018. The stay pins 1052 controls the location of the stop nut 1050.

Figure 17:
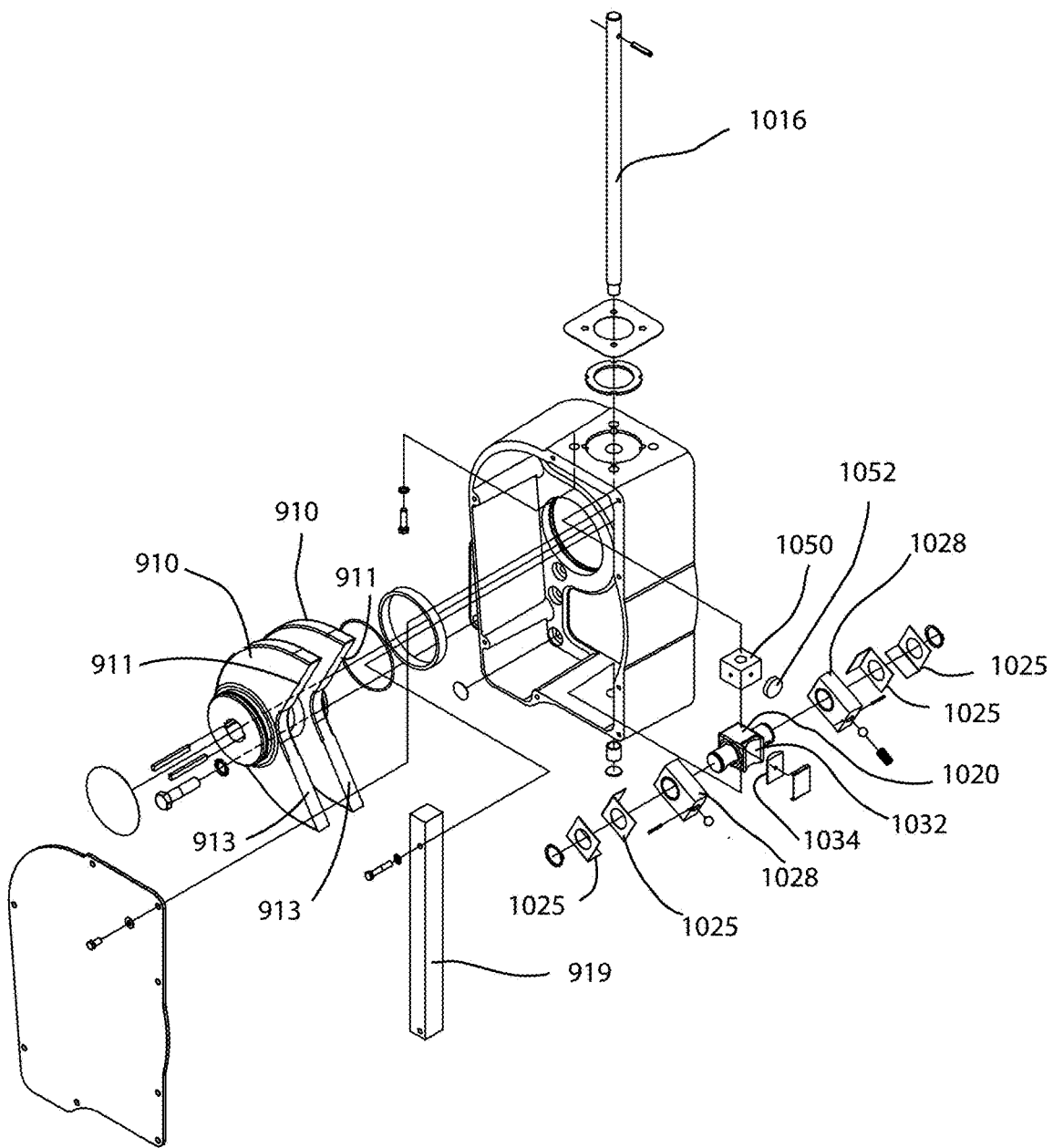
FIG. 17 is an exploded view of an interference element, according to an embodiment.

FIG. 17 is an exploded view of a valve torque unit for opening and closing a valve, according to an embodiment. FIG. 17 shows the various components of the valve construction.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

The claims are:

1. A check valve, comprising:
    a valve body defining an inlet port and an outlet port, the inlet port being in fluid communication with the outlet port;
    a disc disposed within the valve body, the disc configured to rotate from a closed position to an open position;
    a lever arm coupled to the disc the lever arm including a first interference element contact surface and a second interference element contact surface; the first and second interference element contact surfaces being angled relative to one another;
    an actuator shaft; and
    a first interference element coupled to the actuator shaft; the first interference element having a first engagement surface and a second engagement surface;
    wherein the interference element is configured to move on an axis of the actuator shaft to change the maximum open position of the valve disc;
    wherein when the first interference element contact surface is in contact with the first engagement surface of the first interference element, the disc is prevented from moving into a more open; and wherein when the second interference element contact surface is in contact with the second engagement surface of the first interference element the disc can be prevented from moving into a more closed position.

2. The check valve of claim 1, wherein the valve includes a motor that configured to rotate the first interference element along an axis that is perpendicular to the flow of fluid from the inlet port to the outlet port.

3. The check valve of claim 1, wherein when the disc rotates from a closed position to an open position, the disc rotates away from the inlet port.

4. The check valve of claim 1, further comprising a valve seat coupled to the valve body;
    wherein the valve seat encircles a portion of a fluid path from the inlet port to the outlet port.

5. The check valve of claim 4, wherein the valve seat is disposed between the valve body and the disc when the disc is in the closed position.

6. The check valve of claim 1, wherein the disc is biased towards the closed position.

7. The check valve of claim 1, wherein the lever arm can freely rotate away from the first interference element when the fluid flow from the inlet port to the outlet port is decreased.

8. The check valve of claim 1, further comprising a counter weight coupled to the disc.

9. The check valve of claim 8, wherein the counter weight is external to the valve body.

10. The check valve of claim 1, further comprising a compression element coupled to the disc.

11. The check valve of claim 10, wherein the compression element provides a force against the disc moving in a direction from the open position to the closed position.

12. The check valve of claim 10, wherein the compression element comprises an air piston.

13. The check valve of claim 10, wherein the compression element comprises a liquid piston.

14. The check valve of claim 10, wherein the compression element comprises a spring.

15. The check valve of claim 1, wherein the outlet port has a diameter of at least 1 inch and not more than 84 inches.

16. The check valve of claim 1, wherein the inlet port has a diameter of at least 1 inch and not more than 84 inches.

17. The check valve of claim 1, wherein the actuator shaft comprises an anti-rotation element.

18. The check valve of claim 1 wherein the interference element travels along a guide.

* * * * *